(12) United States Patent
Willis

(10) Patent No.: US 7,459,955 B2
(45) Date of Patent: Dec. 2, 2008

(54) INTEGRATED CIRCUIT TEMPERATURE SENSING METHOD

(75) Inventor: John Willis, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 0 days.

(21) Appl. No.: 11/527,914

(22) Filed: Sep. 27, 2006

(65) Prior Publication Data

US 2007/0018714 A1    Jan. 25, 2007

Related U.S. Application Data

(62) Division of application No. 11/130,946, filed on May 17, 2005, now Pat. No. 7,135,909.

(51) Int. Cl.
*H01L 35/00* (2006.01)
(52) U.S. Cl. ....................... 327/512; 374/178
(58) Field of Classification Search ................. 327/512; 374/178
See application file for complete search history.

(56) References Cited

U.S. PATENT DOCUMENTS

| | | | | |
|---|---|---|---|---|
| 5,619,430 A * | 4/1997 | Nolan et al. | .................. | 702/63 |
| 6,480,127 B1 * | 11/2002 | Aslan | .......................... | 341/119 |
| 6,674,185 B2 * | 1/2004 | Mizuta | ....................... | 307/651 |
| 6,888,397 B2 * | 5/2005 | Tsuchiya | ..................... | 327/512 |
| 7,089,146 B1 * | 8/2006 | D'Aquino et al. | ........... | 702/132 |
| 7,107,178 B2 * | 9/2006 | Won et al. | .................... | 702/130 |
| 7,212,064 B1 * | 5/2007 | Schnaitter | ................... | 327/512 |

* cited by examiner

*Primary Examiner*—Kenneth B. Wells
(74) *Attorney, Agent, or Firm*—Toler Law Group

(57) ABSTRACT

A method and system for sensing the temperature of an integrated circuit are presented. The method compares a first current that is proportional to a temperature reading of the integrated circuit to a reference current. While the first current is greater than the reference current, a counter is incremented, and the reference current is increased in response to incrementing the counter. A system for sensing the temperature of an integrated circuit includes a first current source providing a source current to a node. The first current source is based on an input from a proportional to absolute temperature device. The system also includes a second current source providing a sink current to the node, with the amount of sink current being based on an input from a digital control module. The system also includes a comparator coupled to the node to provide a comparator signal that indicates a relationship between the source current and the sink current.

20 Claims, 5 Drawing Sheets

INTEGRATED CIRCUIT TEMPERATURE SENSING METHOD

CROSS REFERENCE TO RELATED APPLICATIONS

This application is a divisional application of U.S. patent application Ser. No. 11/130,946, filed May 17, 2005, which is now U.S. Pat. No. 7,135,909, the content of which is expressly incorporated herein by reference in its entirety.

FIELD OF THE DISCLOSURE

The disclosure relates to a system and method for sensing temperature.

BACKGROUND

The performance of many integrated circuit components varies according to the temperature of the component. For example, dynamic memory modules, such as DRAM, are refreshed at a higher rate as the temperature of the module increases. However, refreshing a dynamic memory module at a predetermined high rate can waste power if the rate is not demanded by the memory module temperature.

Furthermore, the temperature of an integrated circuit may vary over time Moreover, because power usage is often at a premium in an integrated circuit, it is beneficial if a system or method for measuring the temperature conserves power.

Accordingly, there is a need for an improved low power system and method that is capable of measuring the temperature in an integrated circuit.

DETAILED DESCRIPTION OF THE DRAWINGS

A method and system of sensing the temperature of an integrated circuit are presented. In a particular embodiment, the method compares a first current that is proportional to the temperature reading of an integrated circuit to a reference current. While the first current is greater than the reference current, a counter is incremented, and the reference current is increased in response to incrementing the counter. A digital code based on the sensed temperature may be provided to other components of the integrated circuit.

Figure 1:
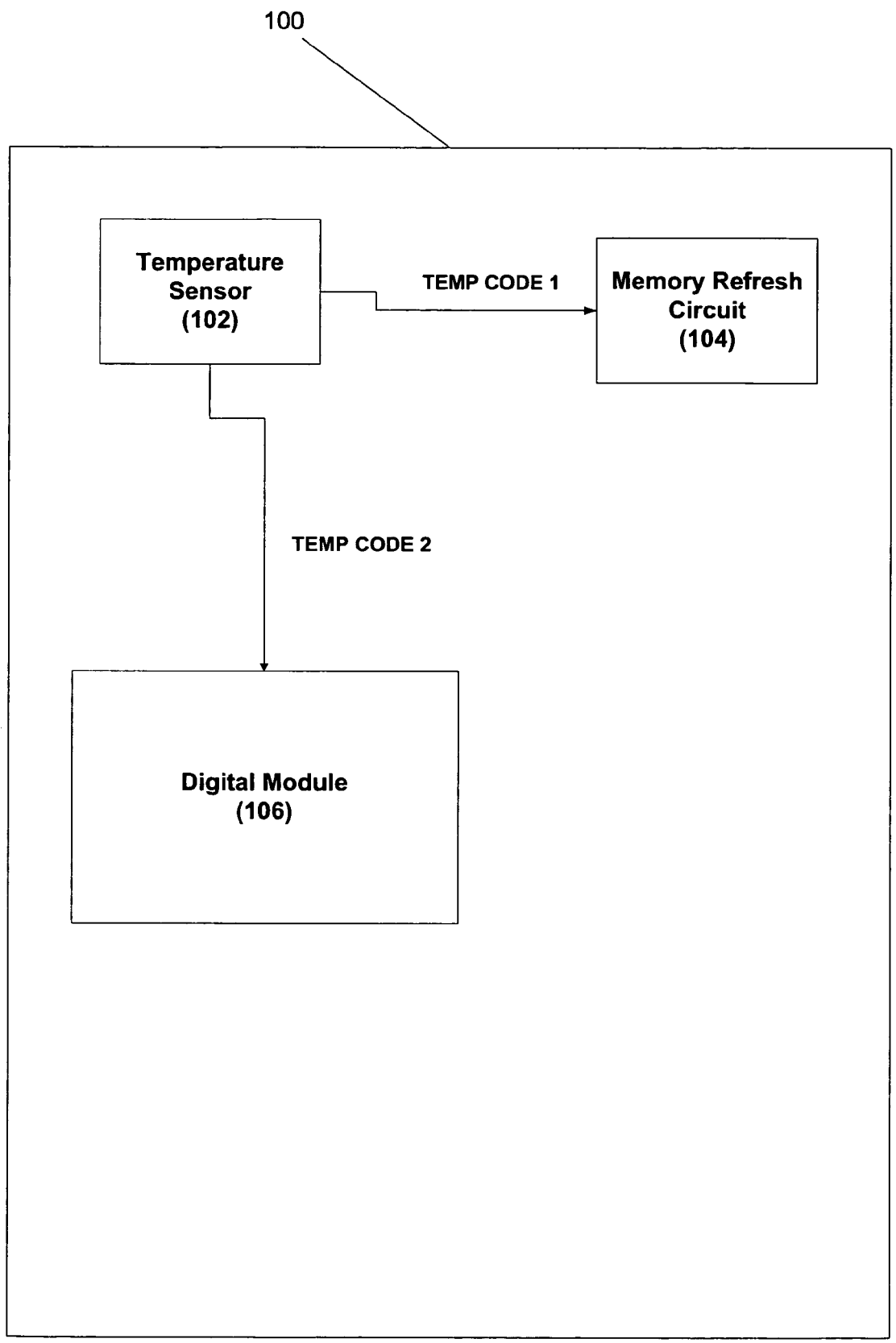
FIG. 1. is a block diagram of an integrated circuit incorporating a temperature sensor.

FIG. 1 is a block diagram of an integrated circuit 100 incorporating a temperature sensor. The integrated circuit 100 includes a temperature sensor 102, a memory refresh circuit 104, and a digital module 106. In a particular embodiment, the temperature sensor 102 is a low power circuit that uses an average of less than 10 microwatts of power.

The temperature sensor 102 measures the temperature of the integrated circuit 100 and provides a digital temperature code (labeled TEMP CODE 1) based on the measured temperature to the memory refresh circuit 104. In a particular embodiment, the memory refresh circuit 104 determines a refresh rate for a dynamic memory module based on this digital temperature code. In the illustrated example, the temperature sensor 102 sends a second digital temperature code (labeled TEMP CODE 2) to the digital module 106. The digital module 106 may be any digital circuitry on the integrated circuit 100, including a microprocessor, data register, digital logic or other digital module. In a particular embodiment, the digital module 106 uses the second digital temperature code in connection with the performance characteristics of the integrated circuit. The second digital temperature code can differ in size from the first digital temperature code. In a particular embodiment, the first digital temperature code is 3 bits and the second digital temperature code is 4 bits.

Figure 2:
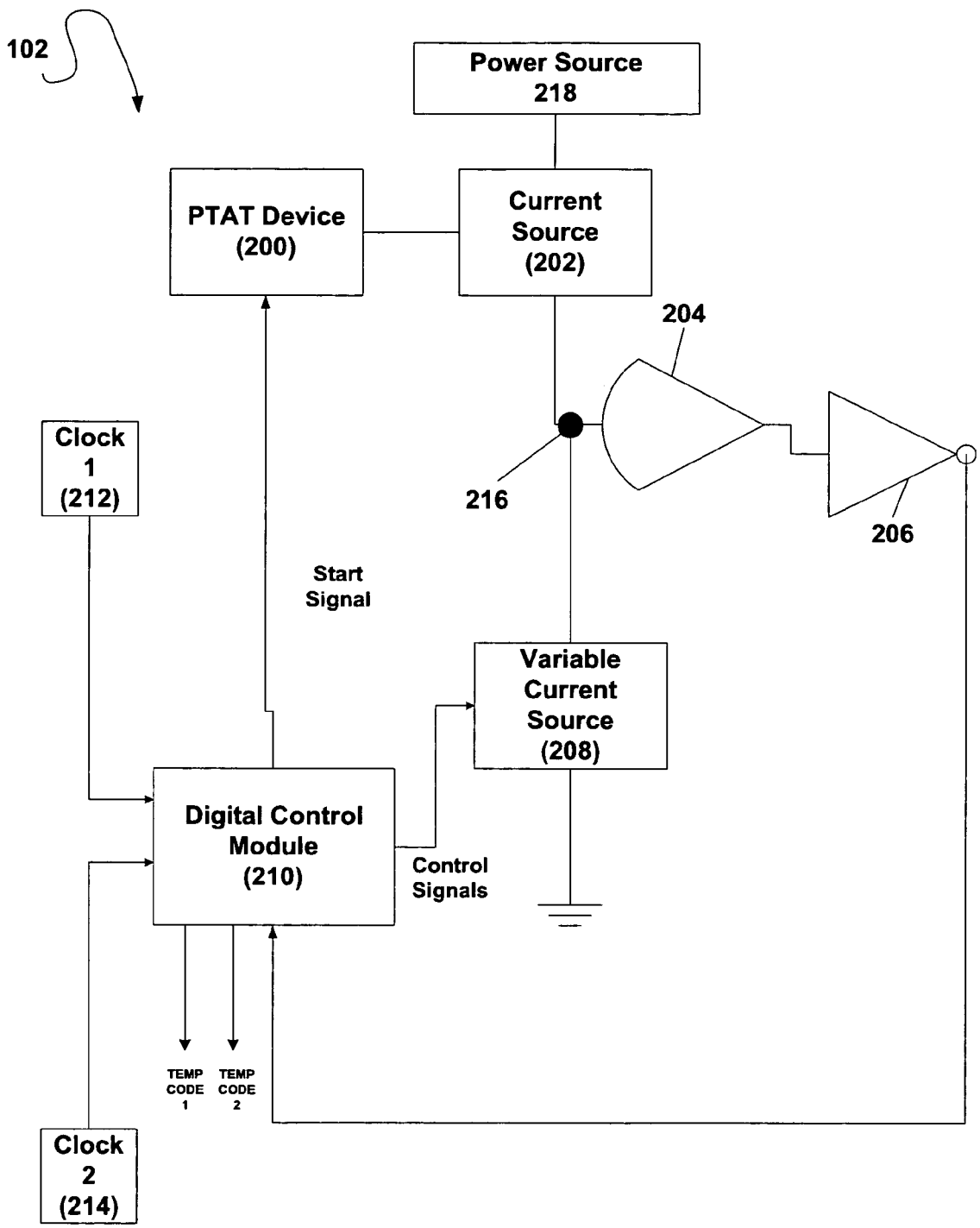
FIG. 2 is a block diagram of an embodiment of a temperature sensor.

Referring to FIG. 2, a block diagram of a particular embodiment of the temperature sensor 102 is illustrated. The temperature sensor 102 includes a proportional to absolute temperature (PTAT) device 200. The PTAT device 200 produces an output that is proportional to the temperature of the integrated circuit 100. This output is coupled to a current source 202. The current source 202 produces a current at an output level that is based on the output of the PTAT device 200. Accordingly, the PTAT device 200 and the current source 202 in combination produce a current that is proportional to a measured temperature of the integrated circuit 100.

The temperature sensor 102 further includes a variable reference current source 208. The variable reference current source 208 is coupled to a digital control module 210. The digital control module 210 controls the level of current produced by the variable reference current source 208.

The temperature based current produced by the current source 202 is provided as a source current to a node 216. The current produced by the variable reference current source 208 is provided as a sink current to the node 216. A comparator 204 is coupled to the node 216 and the current source 202 to provide a comparator signal that indicates a relationship between the source current and the sink current. The comparator signal produced by the comparator 204 remains in a first state (herein referred to as a READ state) when the level of current produced by the current source 202 is greater than the level of current produced by the variable reference current source 208. The comparator signal produced by the comparator 204 is in a second state (herein referred to as a COMPLETE state) when the level of current produced by the current source 202 is less than the level of the variable reference current source 208. Thus the comparator 204 transitions from a READ state to a COMPLETE state to indicate a substantial match between the outputs of the current source 202 and the variable reference current source 208.

An inverter 206 is coupled to the comparator 204 to receive the comparator signal and produce an inverted comparator signal output. The inverted comparator signal output is coupled to an input of the digital control module 210.

The digital control module 210 is able to control the level of current produced by the variable reference current source 208. When the output of the comparator 204 transitions from the READ state to the COMPLETE state, the digital control module 210 completes a temperature measurement and provides first and second digital temperature codes as outputs TEMP CODE 1 and TEMP CODE 2. In a particular embodiment, the digital temperature codes are based on the value of a digital counter that is stopped upon the transition of the comparator 204 from the READ state to the COMPLETE state.

The digital control module 210 has a first clock input coupled to the clock 212 and a second clock input coupled to the clock 214. In response to the clock 212, the digital control module 210 provides a start signal to the PTAT device 200 and starts a temperature reading. In a particular embodiment, the digital control module 210 is in a powered down state prior to providing the start signal and returns to the powered down state after performing a temperature measurement and storing a temperature code.

The digital control module 210 responds to the output of the clock 212 to generate the digital temperature codes. The clock 214 can be divided and a divided clock can drive digital elements within the digital control module 210 to conduct the temperature measurement. In a particular embodiment, the clock 212 operates at a frequency of 10 Hz and the clock 214 operates at a rate of 24 MHz.

Figure 3:
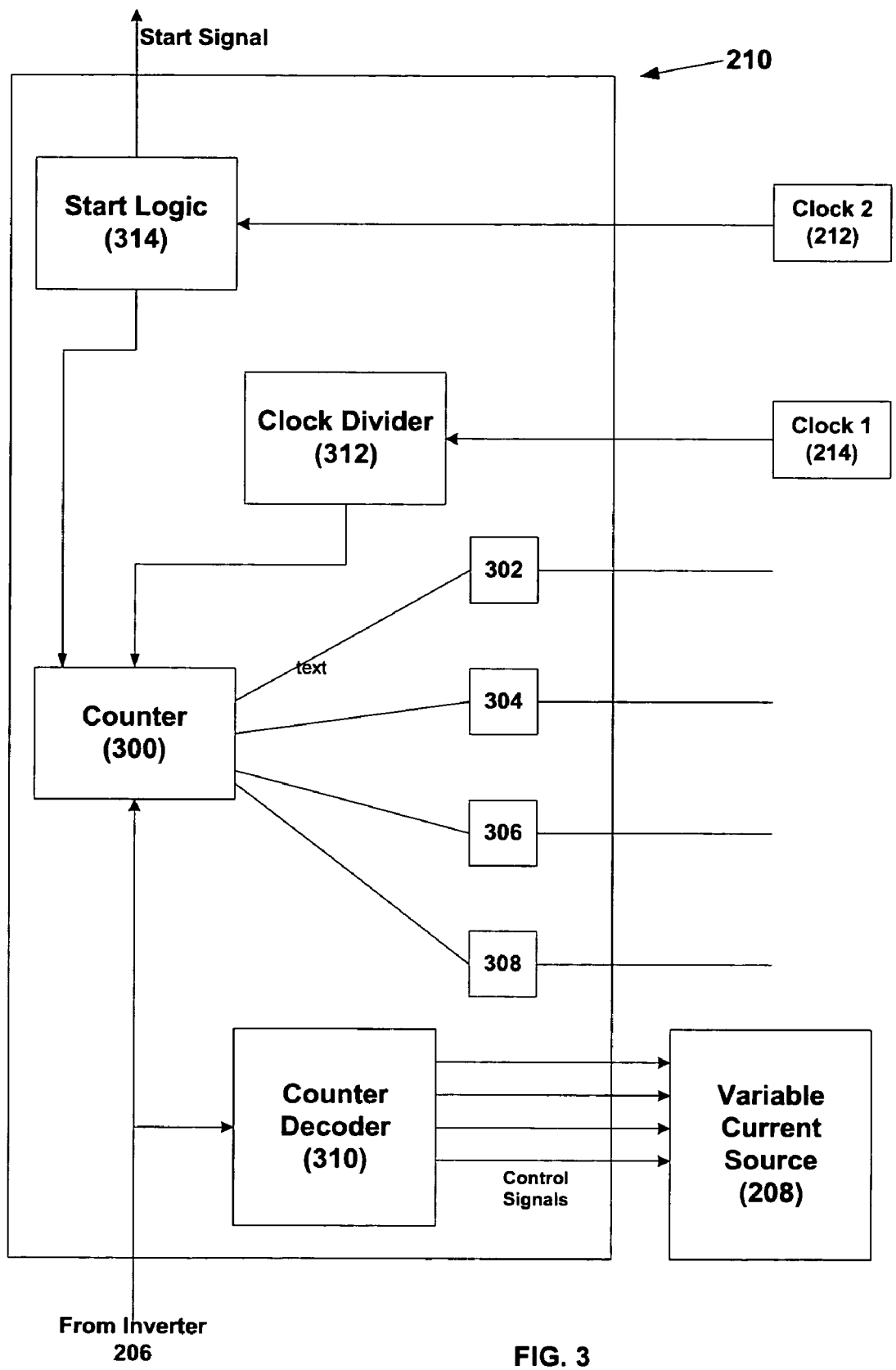
FIG. 3 is a block diagram of an embodiment of a digital control module for use in a temperature sensor.

Referring to FIG. 3, a particular embodiment of the digital control module 210 is illustrated. The digital control module 210 includes a counter 300 and a start logic module 314. The start logic module 314 receives a signal from the clock 212 indicating that a temperature reading should start. The start logic module 314 then sends a signal to the PTAT device 200 to generate its output and sends a signal to the counter 300 to reset and begin counting. The counter 300 is coupled to a clock divider 312 that is coupled to the clock 214 and divides the output of the clock 214 to an appropriate frequency to drive operation of the counter 300.

The counter 300 is further coupled to the output of the inverter 206 that transmits a feedback signal derived from the output of the comparator 204. While the output of the comparator 204 is in the READ state, the counter 300 continues counting, at a rate determined by the output of the clock divider 312. In response to the output of the comparator 204 transitioning to a COMPLETE state, the counter 300 is stopped.

The counter 300 is coupled to a plurality of memory latch devices such as the latches 302, 304, 306 and 308 illustrated. In a particular embodiment, the memory latch devices 302, 304, 306 and 308 are flip-flops. After the counter 300 has stopped after performing a temperature measurement, the counter 300 output is stored in the flip-flops 302, 304, 306 and 308.

The digital control module 210 further includes a counter decoder 310. The counter decoder 310 has an input coupled to the output of inverter 206 and is responsive to the output of the counter 300. The counter decoder 310 is further coupled to the variable reference current source 208. If the output of the comparator 204 is in the READ state, the counter decoder 310 sends a signal to the variable reference current source 208, incrementally increasing the level of current produced by the variable reference current source 208 in a stepwise manner. The current level of the variable reference current source 208 may be increased by adding individual current sources to a current summing node. The current level of the variable reference current source 208 is incremented in a step by step manner in response to each increment of the counter 300 until the comparator 204 detects a substantial match between the current source 202 and the counter controlled variable reference current source 208. Upon detecting a match, the counter 300 is stopped and the counter value is stored as a digital code.

In the event that the integrated circuit 100 is in an extremely low or high temperature state, the counter decoder 310 may increase the output of the variable reference current source 208 to a maximum level. If the counter decoder 310 determines that this maximum level has been reached and the counter 300 has not stopped counting, the counter decoder 310 can output a digital temperature code to the counter 300.

The counter 300 can then output this digital temperature code to memory latch devices 302, 304, 306 and 308. In a particular embodiment, this digital temperature code is selected from an overflow temperature code or an underflow temperature code depending on the amount of current generated by the current source 202.

Figure 4:
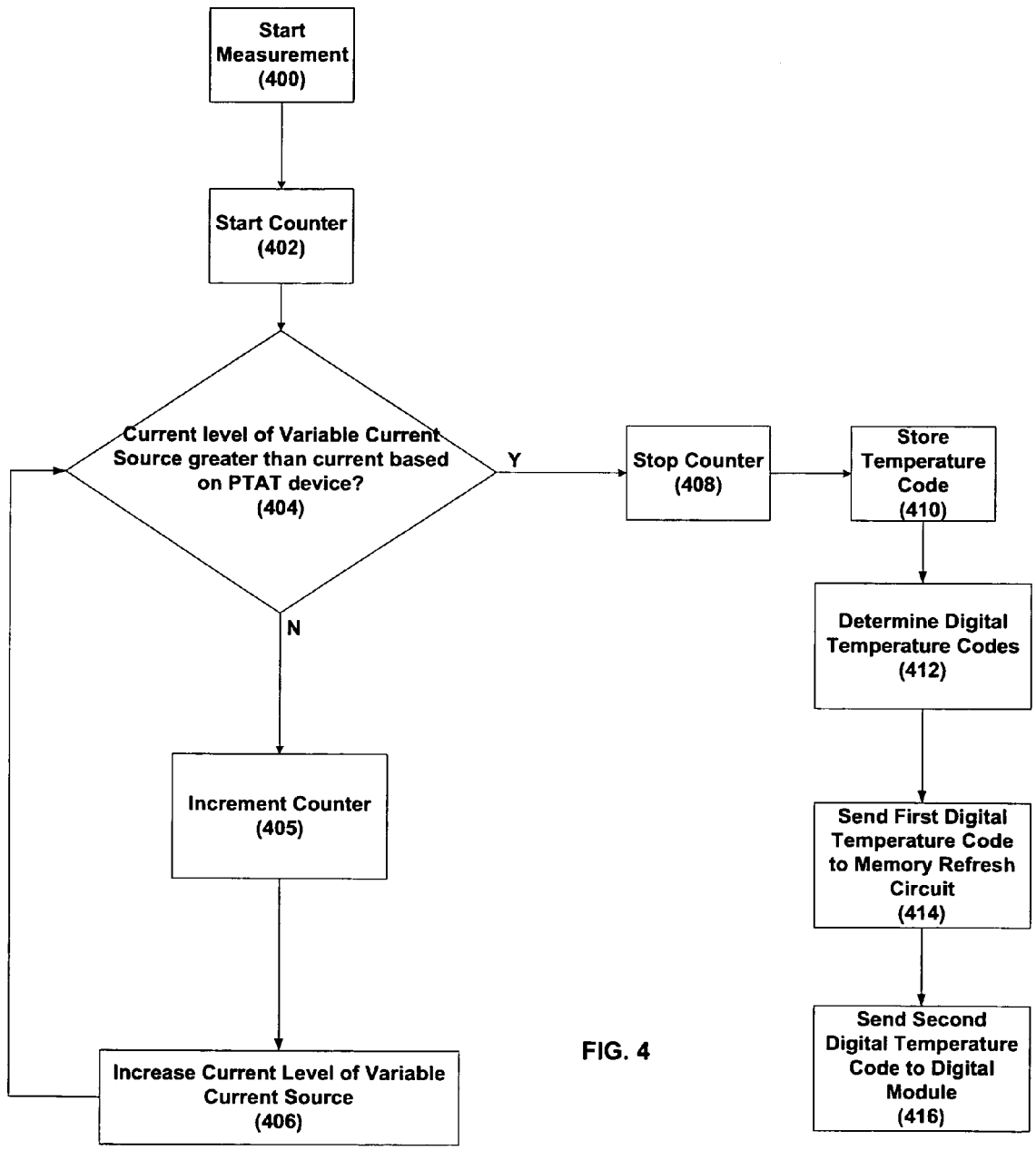
FIG. 4 is a flow chart illustrating a method of sensing the temperature of an integrated circuit.

Referring to FIG. 4, a flow chart of a particular embodiment of a method for sensing temperature in an integrated circuit is illustrated. FIG. 4 begins with step 400, where a start signal is received to start a temperature measurement. After the start signal has been received, a counter is started at step 402. At step 404, the current level based on a PTAT reference is compared to the current level of a variable current source controlled by the counter. If the current level of the variable current source is less than the current level based on a PTAT reference, the counter is incremented at step 405 and the variable reference current is increased at step 406. The current comparison step 404 is then repeated.

If, at step 404, the comparison indicates that the current level produced by the variable current source is greater than the current based on the PTAT reference, the counter is stopped, at step 408. The stopped counter value is then stored at step 410. In a particular embodiment, the counter is a 4 bit counter and the three least significant bits are provided as a first digital code and all four bits are provided as a second digital code. The digital codes are determined at step 412. In a particular embodiment, the codes are determined according to the following table:

| Temperature range (degrees Celsius) | 4 Bit Digital Code |
| --- | --- |
| Less than −40 | 0000 |
| −40 to −30 | 0001 |
| −30 to −20 | 0010 |
| −20 to −10 | 0011 |
| −10 to 0 | 0100 |
| 0 to 15 | 0101 |
| 15 to 25 | 0110 |
| 25 to 35 | 0111 |
| 35 to 45 | 1000 |
| 45 to 55 | 1001 |
| 55 to 70 | 1010 |
| 70 to 85 | 1011 |
| 85 to 95 | 1100 |
| 95 to 105 | 1101 |
| 105 to 115 | 1110 |
| 115 to 125 | 1111 |

In a particular embodiment, at step 414 the first digital code is provided to a memory refresh circuit and the second digital code is provided to a digital module at step 416.

Figure 5:
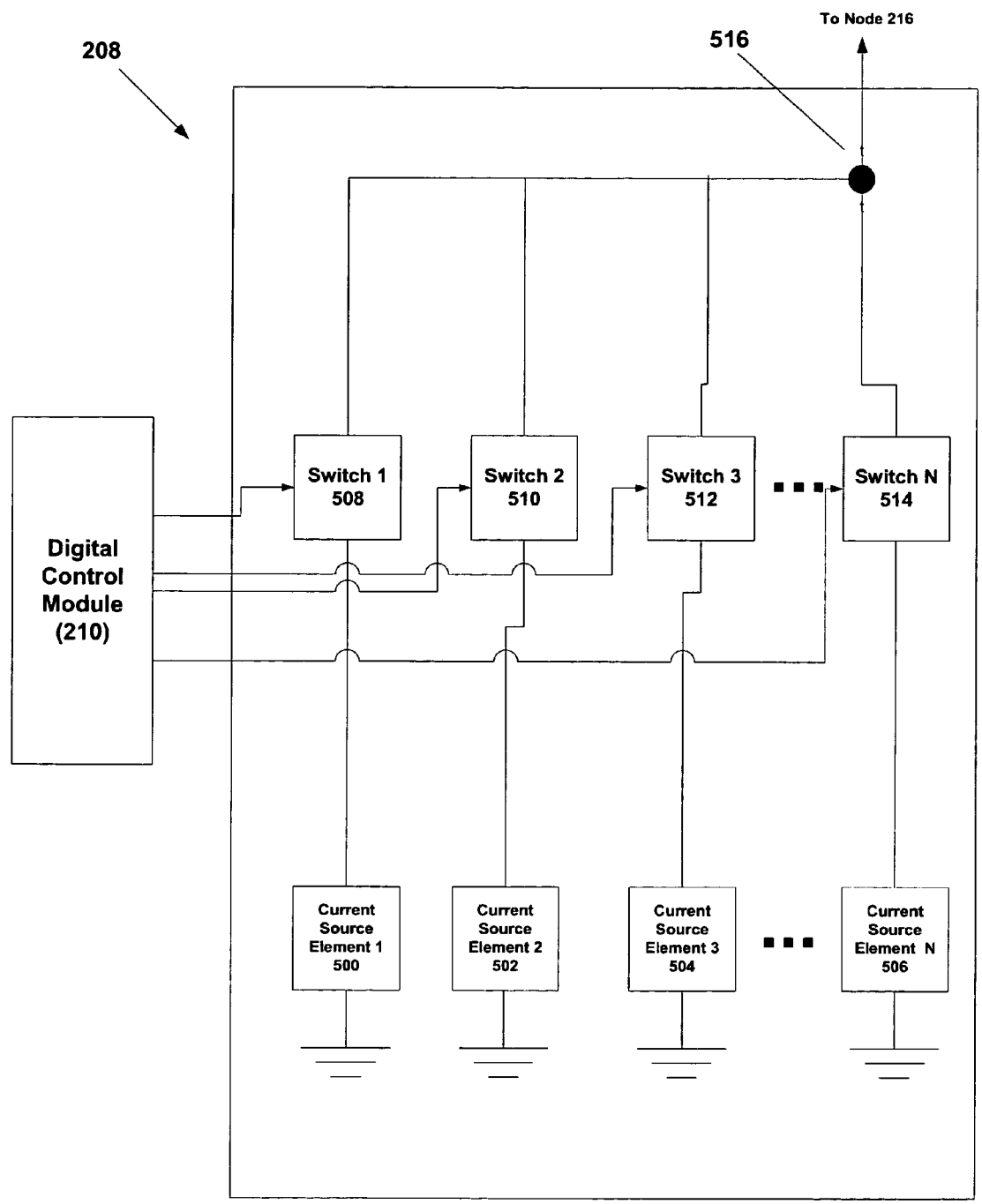
FIG. 5 is a block diagram of a variable reference current source for use in a temperature sensor.

Referring to FIG. 5, a particular embodiment of the variable reference current source 208 is illustrated. The variable reference current source 208 includes multiple current sources such as current source elements 1-N 500, 502, 504, and 506 that are connected to switches 1-N 508, 510, 512 and 514, respectively. The switches 508, 510, 512 and 514 are each coupled to a current summing node 516. Accordingly, if the first switch 508 is closed, the current produced by the first current source element 500 is added to the current available at the current summing node 516. In this manner, the current source elements 500, 502, 504 and 506 may be selectively summed together in an incremental manner.

The switches 508, 510, 512 and 514 are controlled by the digital control module 210. The counter decoder 310 is coupled to the switches 508, 510, 512 and 514 through a plurality of control signals. As the counter 300 moves from its initial state to a final state through a step by step digital count sequence, the counter decoder 310 selectively applies additional control signals to close the switches 508, 510, 512 and 514 and activate the current sources 500, 502, 504 and 506, incrementally increasing the total current produced by the variable reference current source 208 corresponding to the digital count sequence provided by the counter 300.

After a temperature reading is complete, the digital control module 210 can open the switches 508, 510, 512 and 514, so that the variable reference current source 208 is in a proper initial state for subsequent temperature measurements. While only four current source elements 500, 502, 504 and 506 and four switches 508, 510, 512 and 514 have been shown for illustrative purposes, it should be understood that many additional current sources and switches may be used and controlled to provide greater resolution in temperature measurement and/or a wider range of temperature measurement.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    comparing a first current to a reference current, wherein the first current is proportional to a temperature reading of an integrated circuit, and wherein the first current is a source current to an input node of a current comparator and the reference current is a sink current from the input node of the current comparator;
    incrementing a counter while the first current is determined to be greater than the reference current; and
    increasing the reference current in response to incrementing the counter.

2. The method of claim 1, further comprising:
    stopping the counter when the first current is determined to be less than the reference current;
    storing a stopped counter value; and
    providing a first measured temperature code based on the stored counter value.

3. The method of claim 2, further comprising: providing the first measured temperature code to a memory refresh circuit.

4. The method of claim 3, further comprising:
    adjusting a memory refresh rate at the memory refresh circuit based on the first measured temperature code.

5. The method of claim 1, wherein the current comparator generates an output based on a difference between the source current and the sink current.

6. The method of claim 5, further comprising:
    entering a powered down state; and
    returning to a powered up state in response to receiving a clock signal.

7. The method of claim 6, further comprising:
    starting a proportional to absolute temperature device to provide the temperature reading; and
    resetting the counter.

8. The method of claim 6, further comprising:
    storing a value of the counter when an output of the comparator transitions; and
    returning to the powered down state.

9. A method comprising:
    determining that a first reference current is less than a first current at a current comparator having a single input, wherein the first current is proportional to a measured temperature, wherein the first current is a source current to the single input of the current comparator, and wherein the first reference current is a sink current from the single input of the current comparator;
    determining that a second reference current is greater than the first current; and
    indicating that the measured temperature is within a first temperature range.

10. The method of claim 9, wherein the first current is provided by a first current source based on an input from a proportional to absolute temperature device.

11. The method of claim 9, wherein the first reference current and the second reference current are provided by a variable current source.

12. The method of claim 11, further comprising:
    sending a first control signal to the variable current source to generate the first reference current; and
    sending a second control signal to the variable current source to generate the second reference current.

13. The method of claim 12, wherein the first control signal corresponds to a first counter value, and wherein the second control signal corresponds to a second counter value that sequentially follows the first counter value.

14. The method of claim 11, wherein the variable current source selectively sums a plurality of current source elements.

15. A method comprising:
    sending a first temperature code to a first control circuit of an integrated circuit when a reference current provided by a variable current source as a sink current from a node is greater than a temperature-dependent current provided by a first current source of the integrated circuit as a source current to the node, wherein a current comparator having a single input coupled to the node compares the temperature-dependent current to the reference current.

16. The method of claim 15, wherein the first control circuit includes a memory refresh circuit.

17. The method of claim 16, further comprising sending a second temperature code to a second control circuit, wherein the first temperature code and the second temperature code are generated based on a value of a counter that is stopped in response to the reference current exceeding the temperature-dependent current.

18. The method of claim 17, wherein the first temperature code does not equal the second temperature code.

19. The method of claim 16, wherein the first temperature code comprises a digital value indicating a temperature range.

20. The method of claim 15, wherein the temperature-dependent current is based on a proportional to absolute temperature device output to the first current source.

* * * * *